Patented Apr. 16, 1935

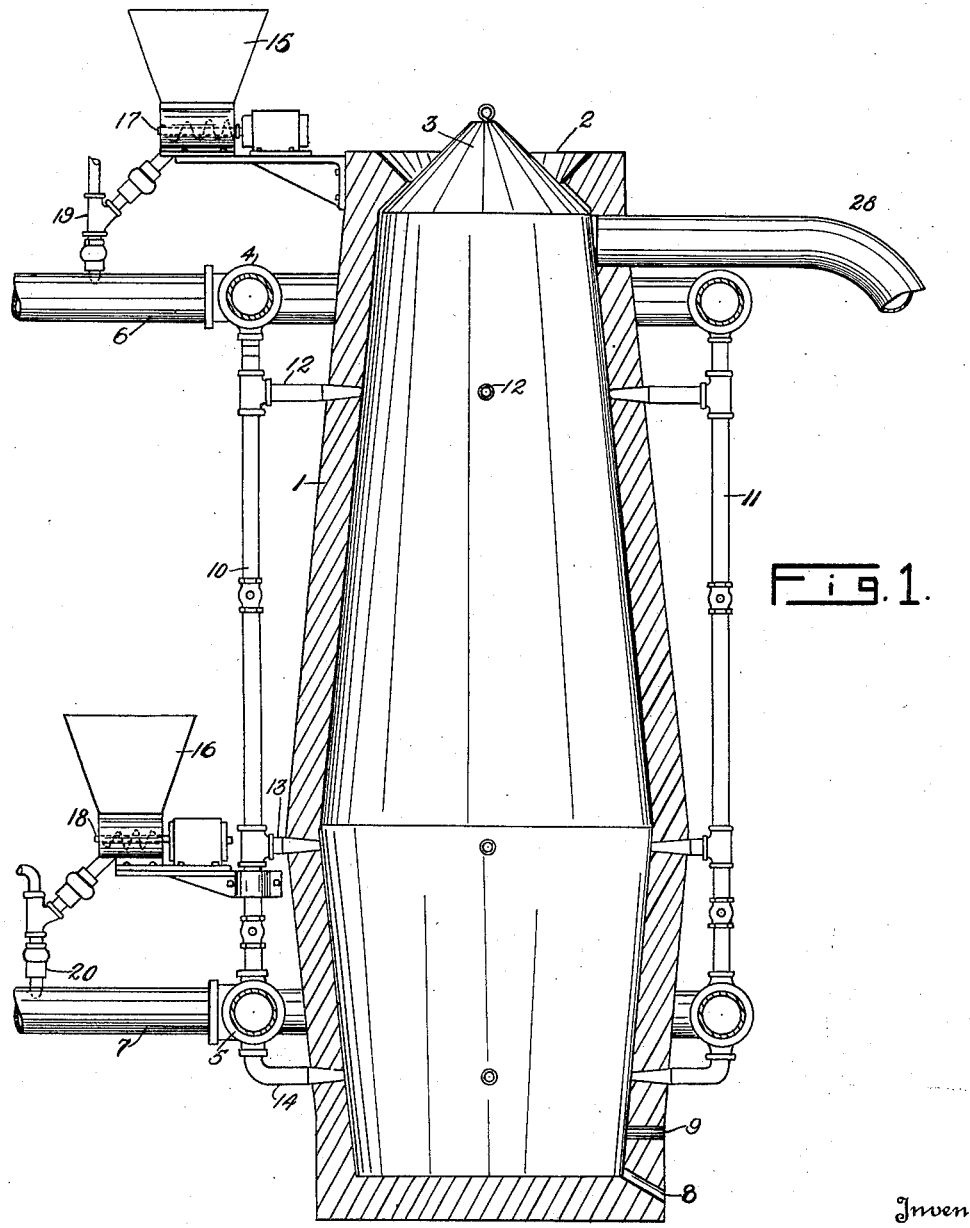

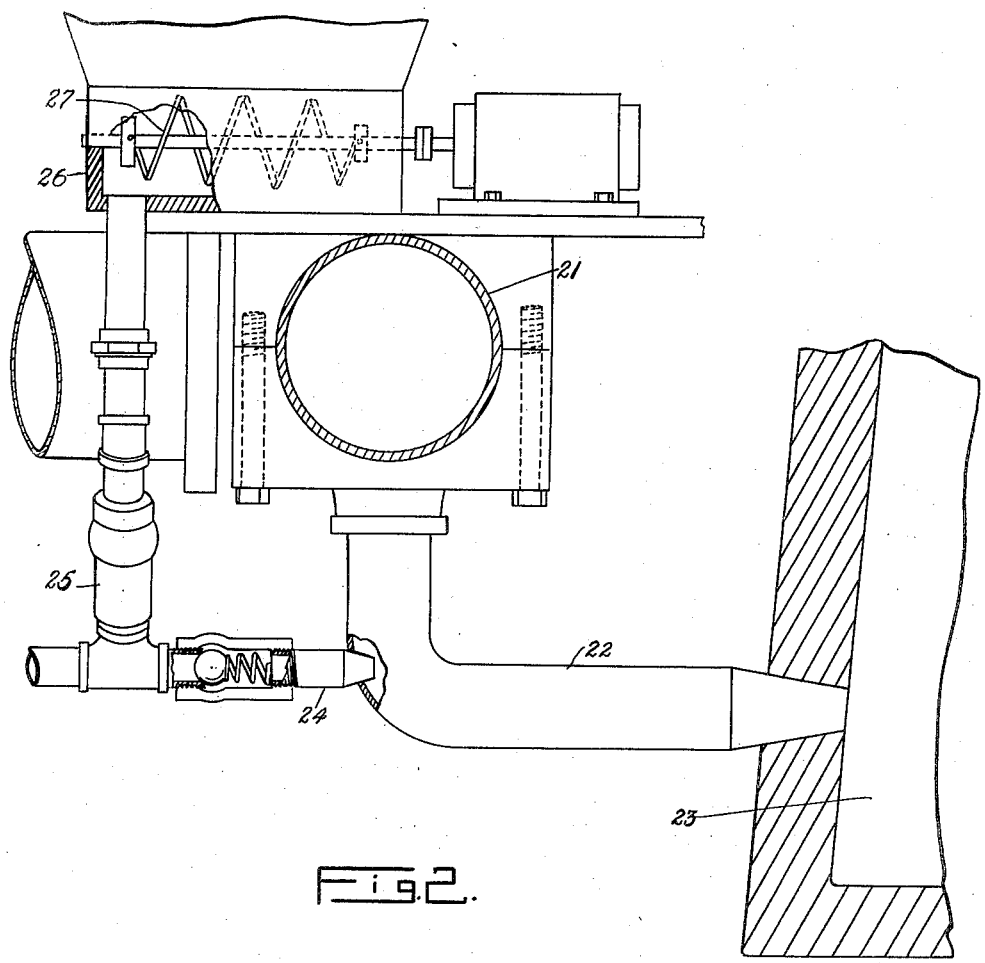

1,997,603

UNITED STATES PATENT OFFICE 1,997,603

BLAST FURNACE METHOD AND APPARATUS

Henry A. Spalding, Hazard, Ky.

Application July 30, 1929, Serial No. 382,157

6 Claims. (Cl. 75—14)

The object of my invention is a method and a means for removing sulphur and/or phosphorus from iron or iron ore, efficiently and economically.

I have discovered that this object can be attained by finely dividing a chemical, having a high affinity for sulphur, and injecting it into the blast-furnace-charge, at certain points between the point at which the charge is fed into the furnace, and the iron-tap-hole.

The chemical I prefer to inject into the furnace is barium oxide, and to inject it into the charge with the hot-air fed in through the tuyères.

In the drawings there is illustrated a blast furnace comprising my improvements and by means of which my hereinafter described method may be exercised.

Fig. 1 shows a furnace in vertical cross section and my attachments in side elevation.

Fig. 2 is a view, partly in side elevation and partly in section, of a modified form of my invention.

In Fig. 1 I have illustrated a common form of blast furnace to which I have added the attachments embodying my invention. The ordinary form of blast furnace, illustrated in Fig. 1, comprises the usual cylindrical furnace body 1, which may be lined with a refractory material and whose open top 2, through which the charge is introduced, is provided with the usual bell 3. The bustle pipes 4 and 5 surround the furnace body 1 and are supplied with hot fluid from the mains by pipes 6 and 7. At the bottom of the furnace body is the usual iron-tap-hole 8, above which is the slag-tap-hole 9. Pipes 10, 11 connect the bustle pipes 4 and 5 and have a series of pipes or tuyères 12, 13 and 14 for directing the blast into the furnace body. The pipes 12 are located immediately below the point at which the charge is fed into the furnace body, pipes 13 lead into the furnace body in the intermediate zone which is known as the zone of fusion and pipes 14 lead into the furnace at the hearth or crucible. I have provided a means for finely dividing and feeding the alkaline compound, preferably barium oxide, into the blast mains or pipes 6 and 7. This means comprises hoppers 15, 16, spiral feeders 17, 18 and injectors 19 and 20.

In use the iron ore mixed with coke or other fuel and limestone and silica and forming the charge, is fed into the furnace at its upper end 2. Hot gas from the off-take 28 is forced into main 6 and hot air is forced into the main 7 and powdered barium oxide is fed into the mains and is blown thence, with air and/or gas, into the furnace and injected into the charge as it descends downward through the furnace. In the upper portion of the furnace, the ascending currents of highly heated gases remove the oxygen from the ore, but leave varying amounts of sulphur and phosphorus. A small portion of this sulphur may pass out in gaseous form as dioxide, but the larger part of it will come into contact with the barium oxide and will form barium sulphide. This compound is readily soluble in the molten slag of the blast furnace and will pass out therewith through the slag opening 9.

The phosphorus that may be present in the charge likewise will combine with the barium and pass into the slag.

Barium sulphide is soluble in water and may be leached from the slag and recovered for commercial purposes.

In the modification, shown in Fig. 2, bustle pipe 21 has an air pipe or tuyère 22 leading through the side wall of the furnace adjacent to the hearth 23. An injector 24 enters the wall of the air pipe 22, in alignment with its opening into the furnace. The injector 24 is fed by vertical pipe 25, with powdered alkaline compound from hopper 26, by spiral feed 27. By providing each tuyère with its feeding apparatus I can control the amount of the chemical that is fed therethrough.

What I claim is:

1. A method of producing sulphur-free iron in a blast furnace comprising continuously introducing into the section of the furnace where the ore is being reduced a mixture of heated off-take gases from the furnace and a powdered substance that has a greater affinity for sulphur than iron has.

2. The method of producing sulphur-free iron in a furnace, comprising introducing into the charge comprising iron at the fusion zone of the furnace, a mixture of heated air and a powdered substance that has a greater affinity for sulphur than iron has and introducing at vertically spaced levels above the fusion zone a mixture of heated off-take gases from the furnace and a powdered substance that has a greater affinity for sulphur than iron has.

3. A method of producing iron of low sulphur content which comprises the step of forcing into the stack of a blast furnace a mixture of hot off-take gas from the furnace and powdered substance that has a greater affinity for sulphur than iron has.

4. The method of producing iron of low sulphur content in a blast furnace comprising introducing variously at vertically spaced levels between the points at which the charge is fed into the furnace and the iron is removed from the furnace, mixtures of hot off-take gas from the furnace and a powdered substance that has a greater affinity for sulphur than iron has and of heated air and said powdered substance.

5. The method of producing iron of low sulphur content in a blast furnace which comprises introducing adjacent the fusion zone a mixture of hot air and a powdered substance that has a greater affinity for sulphur than iron has, introducing at higher level above the fusion zone a mixture of hot air, hot off-take gas from the furnace and a powdered substance that has a greater affinity for sulphur than iron has, and at still higher levels, introducing a mixture of hot off-take gas from the furnace and a powdered substance that has a greater affinity for sulphur than iron has.

6. The method of producing iron of low sulphur content which includes the step of introducing into the furnace charge comprising iron in the melting zone, a blast of hot off-take gas from the furnace together with a powdered substance that has a greater affinity for sulphur than iron has.

HENRY A. SPALDING.